United States Patent [19]

Pierce et al.

[11] Patent Number: 4,463,597
[45] Date of Patent: Aug. 7, 1984

[54] APPARATUS FOR SEALING A PIPELINE

[75] Inventors: Aaron E. Pierce, Humble; Wynn P. Rickey, Houston, both of Tex.

[73] Assignee: Exxon Production Research Co., Houston, Tex.

[21] Appl. No.: 463,217

[22] Filed: Feb. 2, 1983

Related U.S. Application Data

[63] Continuation-in-part of Ser. No. 194,737, Oct. 7, 1980, abandoned.

[51] Int. Cl.³ .............................................. G01M 3/28
[52] U.S. Cl. ................................... 73/40.5 R; 138/89
[58] Field of Search .................. 73/40.5 R, 49.5, 49.1, 73/37; 138/89

[56] References Cited

U.S. PATENT DOCUMENTS

| | | | |
|---|---|---|---|
| 348,960 | 9/1886 | Foster | 137/533.11 |
| 1,683,031 | 9/1928 | Harris | 166/193 X |
| 1,773,941 | 8/1930 | Boynton | 166/193 |
| 2,204,340 | 6/1940 | Bradshaw | |
| 2,834,578 | 5/1958 | Carr | 166/193 X |
| 2,868,297 | 1/1959 | Lamberson, Jr. | 73/40.5 R |
| 3,298,399 | 1/1967 | Slade | 138/97 |
| 3,465,784 | 9/1969 | Cofoid | 137/533.11 X |
| 3,495,626 | 2/1970 | Nagel | 138/97 |
| 3,503,424 | 3/1970 | Sawyer | 138/97 |
| 3,561,490 | 2/1971 | Little | 138/90 |
| 3,645,331 | 2/1972 | Maurer et al. | 166/193 X |
| 3,787,149 | 1/1974 | Dane et al. | 137/533.11 X |
| 3,849,072 | 11/1974 | Ayres | 137/533.11 X |
| 3,903,730 | 9/1975 | Matthews et al. | 73/40.5 |
| 3,911,502 | 10/1975 | Boretos | 137/533.11 X |
| 4,011,620 | 3/1977 | Southgate | 15/104.06 A |
| 4,016,748 | 4/1977 | Boyens | 73/40.5 R |
| 4,049,015 | 9/1977 | Brown | 137/496 |
| 4,069,840 | 1/1978 | Brown | 137/533.11 |
| 4,077,435 | 3/1978 | Van Scoy | 138/93 |
| 4,194,566 | 3/1980 | Maly | 166/307 |
| 4,286,664 | 9/1981 | Bolding | 166/325 |
| 4,419,892 | 12/1983 | Goolsby et al. | 73/49.5 X |

FOREIGN PATENT DOCUMENTS

| | | |
|---|---|---|
| 682611 | 3/1964 | Canada .......................... 137/533.11 |
| 1039836 | 8/1966 | United Kingdom . |
| 1188711 | 4/1970 | United Kingdom . |
| 1227210 | 4/1971 | United Kingdom . |
| 1423132 | 1/1976 | United Kingdom . |
| 1512229 | 5/1978 | United Kingdom . |

OTHER PUBLICATIONS

Lynes-Inflatable Packers; Sales brochure (Circa. 1978).

Primary Examiner—Gerald Goldberg
Assistant Examiner—Joseph W. Roskos
Attorney, Agent, or Firm—Marc L. Delflache

[57] ABSTRACT

A method and system for separating and sealing sections of a pipeline are disclosed. A spherical member is advanced by pressure along the interior of a pipeline to seat against a restraining member forming a pressure-tight seal. The advancing pressure may then be increased within the pipeline to monitor for leaks in the upstream section of the pipeline.

15 Claims, 4 Drawing Figures

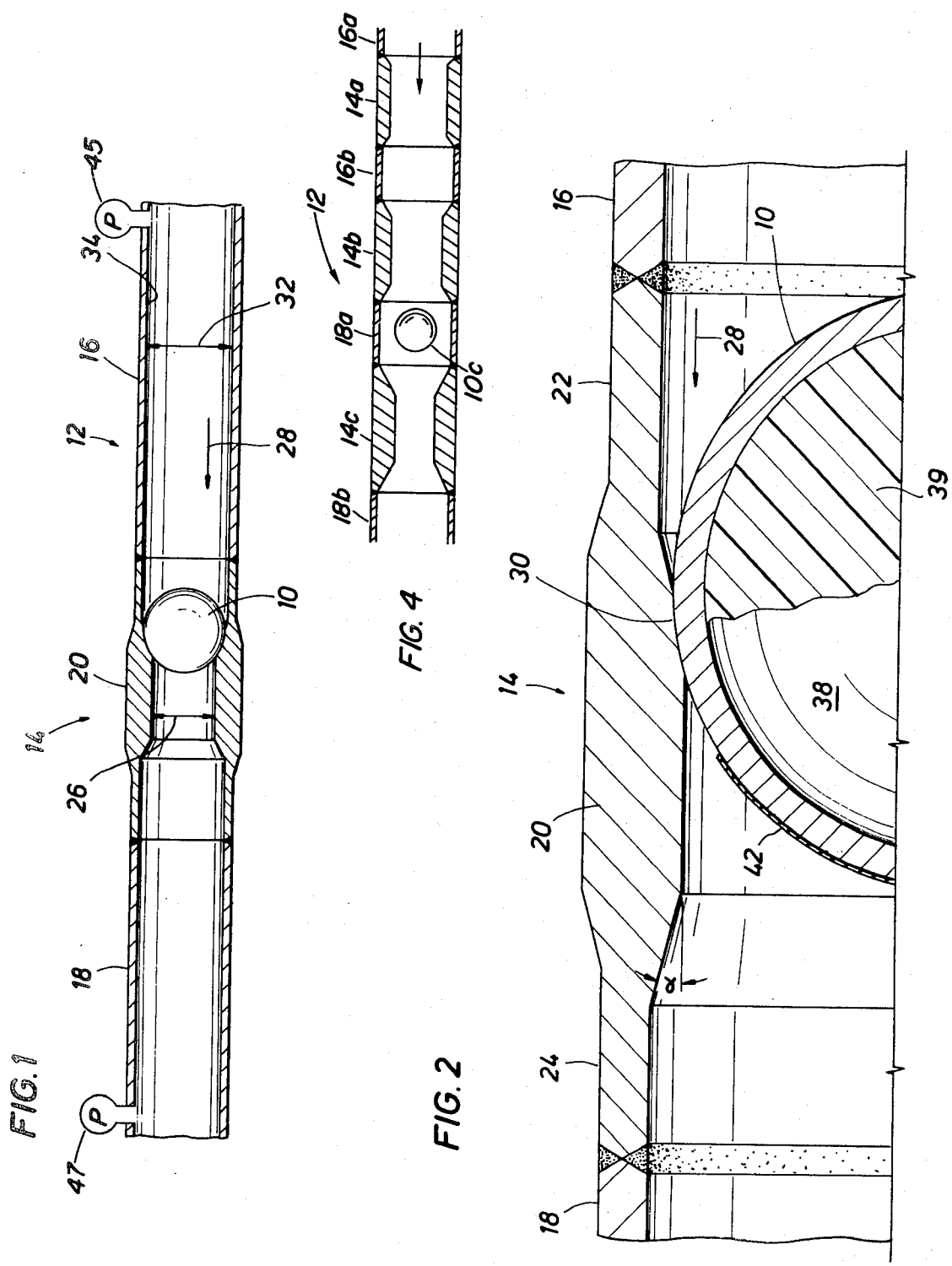

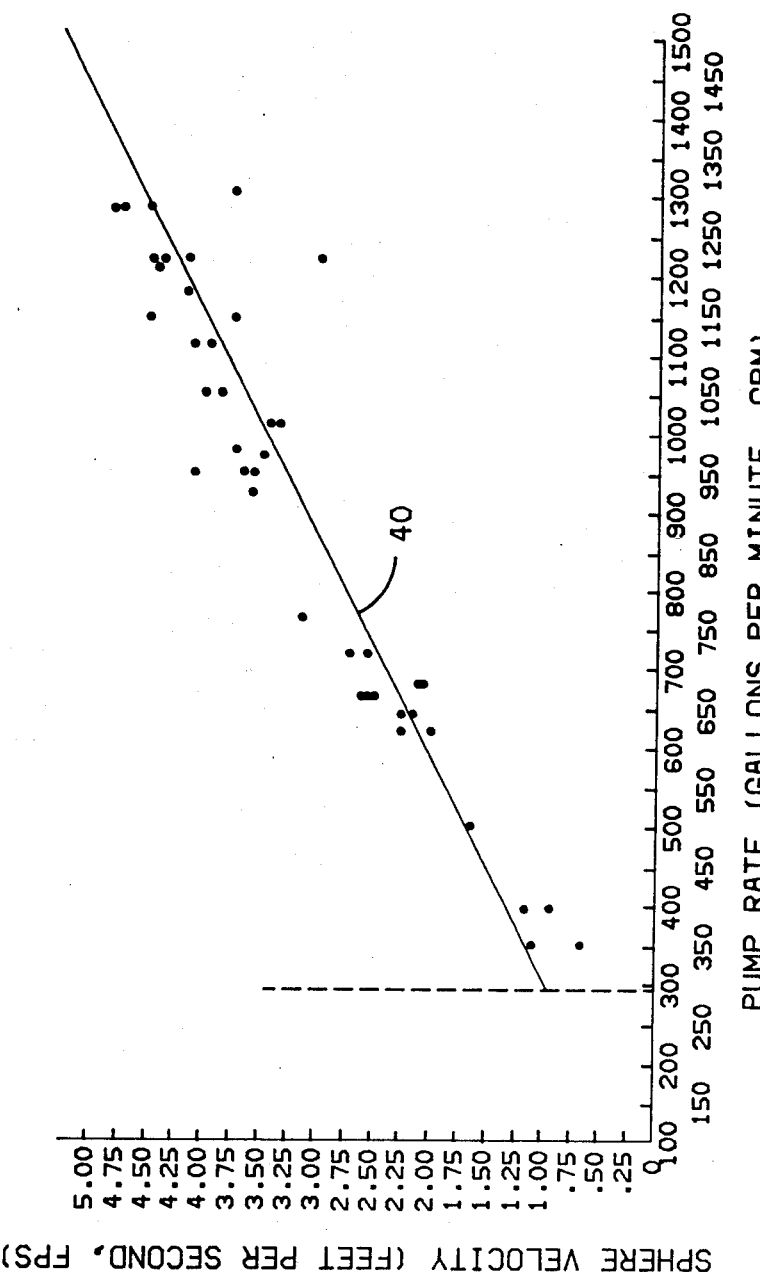

APPARATUS FOR SEALING A PIPELINE

RELATED APPLICATIONS

This is a continuation-in-part application of Ser. No. 194,737, filed Oct. 7, 1980, now abandoned.

BACKGROUND OF THE INVENTION

1. Field of the Invention

This invention relates to a system for sealing off sections of a pipe. More particularly, this invention relates to a separating and sealing system for isolating a first section of a submerged pipeline from a second section of the submerged pipeline.

2. Description of the Prior Art

In the offshore production of oil and gas, pipelines are used to transport produced hydrocarbons to onshore storage and refining facilities. Typically, the pipelines are connected offshore to a platform, temporary surface storage facility or a submerged production system. The pipeline may be attached directly to the structure or to a distribution manifold or a satellite tree.

Occasionally, in maintaining the pipelines it is necessary to check the pressure integrity of the pipeline or a section of the pipeline. One method to accomplish such a check is to divide and seal the pipeline into a series of sections by means of a pressure-moveable plug member commonly referred to as a "pig means" (see U.S. Pat. Nos. 3,561,490; 3,903,730; and 4,077,435). Pressure may then be introduced sequentially into each section to check for leaks. However, for specific applications such as sealing a section of a pipeline which has a bend with a very small radius of curvature, the use of such conventional pig means may be difficult. In addition, the pig means disclosed in U.S. Pat. Nos. 3,561,490 and 4,077,435 are complicated and expensive to manufacture and maintain.

Therefore, the need exists for an improved system for separating and sealing a pipeline which is simple to manufacture and maintain and which is capable of passing through pipelines having unusual geometric configurations or operating requirements.

SUMMARY OF THE INVENTION

The present invention is directed to a separating and sealing system for isolating a first section of a submerged pipeline from a second section of the submerged pipeline.

The system comprises a pipeline having at least two sections and a spherical member adapted for movement along the interior of the pipeline by induced pressure. The system includes an annular restraining member adapted to be positioned between the first and second sections of the pipeline. The restraining member includes a central protruding portion having a lip surface at one end for contacting the spherical member and thereby stopping the advancement of the spherical member. The lip surface has a curved profile at a radius substantially the same as the radius of the spherical member. Thus, upon contact of the spherical member with the lip surface, a pressure-tight seal is formed between the first and second sections of the pipeline. The system also includes a pump means for pressurizing one section of the pipeline to verify the pressure integrity of that one section and a pump means for creating a pressure differential across the seal formed by the spherical member and the restraining member permitting the disengagement of the spherical member from the restraining member and the retrieval of the spherical member after the pressure in the first section is reduced.

Preferably, the specific gravity of the spherical member is substantially the same as the specific gravity of the fluid flowing within the pipeline so that the spherical member is neutrally buoyant and, therefore, more easily advanced.

Examples of the more important features of this invention have been summarized rather broadly in order that the detailed description which follows may be better understood. There are, of course, additional features of the invention which will be described hereafter and which will also form the subject of the claims appended hereto.

BRIEF DESCRIPTION OF THE DRAWINGS

In order to more fully understand the drawings used in the detailed description of the present invention, a brief description of each drawing is provided.

FIG. 1 is a sectional view of the present invention wherein a spherical member is seated against a restraining member.

FIG. 2 is a detailed drawing of that portion of FIG. 1 which illustrates the contact area between the restraining member and the spherical member.

FIG. 3 is a graph of sphere velocity (feet per second) versus pump rate (gallons per minute) generated in the preliminary experiments described below.

FIG. 4 is a sectional view of the present invention having a series of restraining members.

DETAILED DESCRIPTION OF THE PREFERRED EMBODIMENT

Briefly, the present invention is a system for separating and sealing a submerged pipeline which method and system are reversible and capable of operating in pipelines having unusual geometric configurations, specifically bends with a small radius of curvature.

Referring to FIG. 1, a spherical member 10 (also referred to as a sphere) is illustrated inside of a pipeline 12. The sphere 10 is seated against a circular restraining member 14 (also referred to as a seal trap or annular member). The member 14 is attached between first and second sections 16 and 18 of the pipeline 12 by conventional methods, i.e., welding.

FIG. 2 is a detail of the restraining member 14 and the spherical member 10 as illustrated in FIG. 1. The restraining member is thicker at its central portion 20 than at its end portions 22 and 24. The inner diameter 26 of the restraining member at the central portion 20 is selected so that the spherical member cannot pass by the restraining member when it is advancing in the direction of the arrow 28. The central portion includes a curved lip surface 30 at one end having substantially the same radius of curvature as the spherical member. Thus, once the spherical member 10 engages the lip surface 30, a pressure-tight seal is achieved.

The relationship between the diameter of the spherical member and the inner diameter 32 of the first section is important due to the resulting annular clearance between the spherical member and the inside of the pipeline. As verified by the experiments described below, the diameter of the spherical member preferably should be ⅛ to 1 inch (3.2 to 25.4 mm) less than the inner diameter 32 of the first section 16 of the pipeline and, most preferably 1/6 to ½ inch (4.23 to 12.7 mm) less than the inner diameter 32. In selecting the annular clearance between the spherical member and the inner diameter of the pipeline, any irregularities on the inner surface 34 of the pipeline, such as protruding field welds, as well as the desired flow velocity of the spherical member should be taken into account. The greater the annular clearance between the spherical member and the inner diameter of the first section, the greater the loss in pumping capacity due to the increased flow path available around the spherical member (referred to as "blow-by loss"). Therefore, while it is advantageous to increase the annular clearance to accommodate for irregularities on the inner surface of the first section, the annular clearance cannot be too large because of the blow-by loss. Thus, for pipelines with an inner diameter between approximately 6 and 18 inches (15.2 and 45.7 cm), the preferred annular clearance is 1/12 to ½ inches (2.1 to 12.7 mm) and, most preferably, 1/6 to ¼ inches (4.23 to 6.4 mm).

To facilitate the advancement of the spherical member through the pipeline, the specific gravity of the spherical member with respect to the specific gravity of the fluid flowing in the pipeline should be considered. The ratio of the specific gravity of the spherical member to the specific gravity of the fluid flowing through the pipeline should be between 0.70 and 3.00. Preferably, this ratio should be between 0.75 and 2.00 and, more preferably, between 0.85 and 1.50. Most preferably, this ratio should be approximately 1.0. Thus, the spherical member is substantially neutrally buoyant, and the amount of friction between the spherical member and the bottom side of the inner surface of the pipeline is minimized. In addition, the pumping-capacity requirement is also reduced because the annular clearance is maintained substantially constant around the sphere. A neutrally buoyant sphere will also minimize blow-by loss around only one side of the sphere that may otherwise occur because of a disproportionate gap in the annular clearance, thereby causing an increased pumping requirement.

The diameter of the spherical member should not be too small; otherwise, it might be forced past the central portion 20 of the restraining member. The inner diameter of the central portion should be preferably 80–95% of the diameter of the spherical member, more preferably 90–95%. Otherwise, as verified by the experiments, if the inner diameter is more than 95% of the diameter of the spherical member, there may not be enough contact area available on the lip surface 30 to keep the stresses in the spherical member below its yield point, and the spherical member may be deformed and forced past the restraining member. The preferred ratio of the diameter of the spherical member to the inner diameter of the restraining member at the central portion is 1.05 to 1.20 and, more preferably, 1.05 to 1.10.

Through-the-Flowline (TFL) tools (which are used to perform various well completion functions) and various types of pigging means are frequently run through the pipeline 12 to a well site or other facilities. Such TFL tools and pigging means generally require a minimum annular clearance between the inner diameter of the pipe and their outer diameters. Therefore, in selecting the inner diameter of the central portion of the restraining member, the minimum clearance requirements of the types of TFL tools and pigging means that must be run past the central portion also should be considered.

EXPERIMENTS

Experiments were conducted to test the present invention as indicated in FIGS. 1 and 2. Preliminary experiments were conducted in two phases. The first phase (Phase I) consisted of three tests using pipelines with an inner diameter of 11.375 and 11.94 inches (28.9 and 30.3 cm) and spheres of 10.95 to 11.825 inches (27.8 to 30. cm) in diameter. The second phase (Phase II) also consisted of three tests using a pipeline with an inner diameter of 7.625 inches (19.4 cm) and spheres of 7.40 to 7.45 inches (18.8 to 18.9 cm) in diameter.

Each sphere was manufactured from aluminum. The spheres were made of aluminum due to the availability, cost, strength-to-weight ratio, and workability of the material. However, the spheres may be made of any kind of material which satisfies the specific requirements of the present invention.

In both Phases I and II the fluid flowing through the pipeline was fresh water with a density of 62.4 pounds per cubic foot (1 gram per cubic cm). To provide for substantially neutral buoyancy, each sphere included a hollow inner chamber 38. To create such a chamber 38, each sphere was made in two halves. Each half was hollowed out to form part of the chamber, and the halves were then welded together to form the sphere.

The experiments indicated that the inner chamber 38 preferably should be filled with a hard material 39 to strengthen the sphere and prevent it from being deformed and extruded past the restraining member. For example, the chamber 38 could be filled with woods-metal or an epoxy resin such as Brutum 78 (TM). In some of the tests, the spheres were filled with Brutum 78 epoxy. The epoxy was injected into the chamber 38 through a small ¼ inch (6.4 mm) diameter hole in the wall of the sphere; after both halves were welded together. The ¼ inch (6.4 mm) diameter hole was then tapped and plugged. However, other methods may be used to internally strengthen the sphere. For example, the chamber 38 may be pressured-up to a level greater than the anticipated local stresses caused by contact with the seal trap. Alternatively, the hollow chamber may be internally strengthened with a series of plates or braces.

PHASE I

Phase I consisted of a flow test in a vertical and horizontal orientation and two pressure tests.

The flow test indicated that the velocity of the sphere is directly proportional to the flow or pump rate of the fluid in the pipe. Referring to FIG. 3, the flow tests indicated that a sphere will travel vertically through the pipeline with a pump rate as low as 290 gallons per minute (1098 liters per minute). For the test sphere, this represented a minimum velocity of 0.8 feet per second (0.24 meters per second). The line 40 in FIG. 3 was generated by a least squares statistical summary and illustrates that there is a linear relationship between the pump rate and the velocity of the sphere.

The flow test also indicated that the specific gravity of the sphere should be most preferably approximately 1.0. The relatively easy movement of the flow test sphere is attributed to the fact that the specific gravity of the sphere was 0.996.

The pressure tests indicated that the seal trap should include a circular lip surface 30, as illustrated in FIG. 2, to achieve a pressure-tight, metal-to-metal seal. In the first pressure test, a straight 20° tapered surface, as illustrated on the down-stream end 24 of the central portion with the angle (see FIG. 2), was used as the contact surface with the sphere; however, the straight tapered surface was not capable of maintaining a pressure-tight, metal-to-metal seal. The lip surface 30 was reshaped to conform with the radius of curvature of the sphere. The second pressure test indicated that the curved lip surface was capable of maintaining a pressure-tight, metal-to-metal seal.

As an added sealing means, the sphere may be coated with a thin layer (i.e., ⅛ inch (3.2 mm) thick) of elastomeric material 42 (shown partially in FIG. 2) such as neoprene or polyurethane. Thus, upon the sphere's engagement with the lip surface, a tight elastomeric seal is achieved. The tests of Phase I indicated that such a coating would be helpful in assuring a pressure-tight seal; however, the elastomeric coating must be carefully applied to ensure adequate bonding with the outside surface of the sphere. Otherwise, contact with the inside wall of the pipeline may damage the coating by peeling it off.

The pressure tests were of a static nature. That is, the spheres were seated by hand in a seal trap test fixture. Pressure was then introduced on the upstream side of the sphere. The second pressure test indicated that the present invention is capable of holding a pressure of 3900 psi (274 kilograms per square cm (kg/cm2)) for over 18 hours with a minimum of deformation to the sphere (less than 1.4 percent of the sphere's diameter along any axis). Such deformities are acceptable standards for industry application of the present invention.

The more significant dimensions for the three tests of Phase I were:

A. Flow tests:
  Pipeline inner diameter: 11.94 inches (30.3 cm)
  Sphere diameter with elastomeric coating: 11.825 inches (30. cm)
  Sphere diameter without elastomeric coating: 11.575 inches (29.4 cm)
  Specific gravity of sphere without elastomeric coating: 0.996 (compared to fresh water)

B. First pressure test:
  Pipeline inner diameter within test fixture: 11.375 inches (28.9 cm)
  Sphere diameter: 10.950 inches (27.8 cm)
  Specific gravity of sphere: 0.997 (compared to fresh water)
  Seal trap inner diameter at central portion: 10.375 inches (26.4 cm)

C. Second pressure test:
  Pipeline inner diameter within test fixture: 11.375 inches (28.9 cm)
  Sphere diameter: 11.200 inches (28.5 cm)
  Specific gravity of sphere: 0.82 (compared to fresh water)
  Seal trap inner diameter at central portion: 10.375 inches (26.4 cm)

PHASE II

Phase II consisted of three pressure tests. These tests confirmed that the sphere was capable of holding a pressure differential of over 4500 psi (316 kg/cm2) for extended periods of time with no leakage.

The first test was a static test, as discussed above. The second and third tests were dynamic. That is, a sphere was pumped through a 80 foot (24.4 meters) section of 8 inch schedule 80 pipe and seated on the seal trap with the pressure head. As noted above, the three tests indicated that the present invention is capable of sealing and holding a pressure differential of over 4500 psi (316 kg/cm2) for extended periods of time. Pressure loss due to leakage past the sphere/seal trap never occurred.

The dynamic tests were also valuable because they indicated the amount of differential back pressure required to unseat the sphere. Once the test pressures of 4500 psi (316 kg/cm2) were released, the second pressure test indicated that only about 300 psi (21.1 kg/cm2) back pressure was required to unseat the sphere for retrieval. The third pressure test did not indicate a noticeable back-pressure requirement to unseat the sphere.

In Phase II, the inner diameter of the pipeline was 7.625 inches (19.4 cm), while the inner diameter of the central portion of the seal trap was 6.70 inches (17. cm). The diameters and specific gravities of the three spheres were:

A. First pressure test (Static test):
  Sphere diameter: 7.45 inches (18.9 cm)
  Specific gravity: 1.7 (compared to fresh water)

B. Second pressure test (Dynamic test):
  Sphere diameter: 7.402 inches (18.8 cm)
  Specific gravity: 1.7 (compared to fresh water)

C. Third pressure test (Dynamic test):
  Sphere diameter: 7.402 inches (18.8 cm)
  Specific gravity: 1.7 (compared to fresh water)

The dynamic tests indicated that even with a specific gravity of 1.7 the test spheres performed as well as a pressure-sealing means. To minimize the pumping-capacity requirement and frictional damage to the sphere and pipeline, the flow test of Phase I clearly indicated that most preferably the specific gravity should be approximately 1.0.

In addition to the pressure tests, three types of commonly used pipeline pig means (cleaning, paraffin-removal and scraper) were run down the 8 inch test pipe and past the restraining means several times. These tests indicated no visible damage to the pig means in advancing past the restraining means. In addition, it took less than 300 psi (21.1 kg/cm2) to advance each pig means past the restraining means which is an acceptable pressure for moving pipeline pig means.

Subsequent dynamic experiments were conducted with a solid aluminum sphere having a diameter of 7.125 inches (18.1 cm) and run through a 80 foot section of 7.625 inch (19.4 cm) inner diameter pipe. The sphere was seated on a seal trap having a minimum inner diameter of 6.525 inches (16.6 cm). The sphere held a pressure differential of over 4500 psi (316 kg/cm2) for over 33 hours. The pressure was then released, and the sphere was unseated with only 50 psi (3.51 kg/cm2) of back pressure.

During these subsequent experiments the same three pipeline pig means mentioned above were run past the seal trap to verify that normal pipeline maintenance operations may continue. All three pig means passed by the seal trap with the normal amount of pressure induction generally required and with no visible change to the seal trap.

The test environments for all the experiments were accurate representations of actual field environments. The working pressures were representative of actual well production pressures for the testing of pipeline leaks. In addition, the dimensions for the pipelines tested were similar to those actually in place in present well production facilities.

Summarily, the experiments indicated that the present invention performed very well as a pressure-sealing means.

OPERATION

To practice the present invention, the sphere is inserted at an entry point upstream the first section of the pipeline. Pressure is exerted against the back side of the sphere to advance it along the interior of the pipeline toward the seal trap or annular member. The pressure is provided by a pump 45 or equivalent.

Once the sphere approaches the seal trap and engages the lip surface, the pressure in the first section is increased by pump 45 or a secondary pump; the first section is then monitored for leaks. Thereafter, the pressure in the first section of the pipeline is released, and a back pressure is introduced into the second section of the pipeline by a pump 47. Alternatively, a pressure differential may be created across the seal by a vacuum or suction created by pump 45. Once disengaged, the sphere is advanced back up the first section and retrieved.

A pipeline may include a series of restraining members between successive sections. Each successive restraining or annular member would have a smaller inner diameter enabling the sealing of any set of adjacent sections. Referring to FIG. 4, pipeline 12 comprises a series of sections 16a, 16b, 18a, 18b connected by restraining members 14a, 14b, and 14c, respectively. The inner diameter of the restraining member 14a is larger than the inner diameter of the restraining member 14b, which is larger than the inner diameter of the restraining member 14c. By inserting a sphere 10c having a smaller diameter than the inner diameters of restraining members 14a and 14b but larger than the inner diameter of member 14c, sphere 10c may be inserted upstream, for example in section 16a, and pumped past members 14a and 14b to seat on member 14c. Thus, sections 18a and 18b may be separated and the pressure integrity of sections 16a, 16b and 18a monitored. The sphere 10c may then be retrieved in accordance with the above disclosure. It will be obvious to one skilled in the art based on this disclosure that each of the sections 16a, 16b, 18a, 18b may be checked for pressure integrity in this manner The present invention has been described in terms of a preferred embodiment. Modifications and alterations to this embodiment will be apparent to those skilled in the art in view of this disclosure. It is, therefore, intended that all such equivalent modifications and variations fall within the spirit and scope of the present invention as claimed.

What is claimed is:

1. A pipeline pressure sealing and separation system, said system comprising:
a pipeline, having at least two sections, adapted for the transport of a fluid thereby and being substantially impediment free;
a first integral annular member adapted to be positioned between the first and second sections of the pipeline, said annular member having an inner protruding portion with a lip surface;
a spherical member adapted for substantial longitudinal movement by pressure-induction along the interior of the pipeline and capable of contacting said lip surface, said lip surface being curved at a radius of curvature substantially the same as the radius of curvature of said spherical member so that upon engagement of said spherical member with said lip surface, a pressure-tight seal separates the first and second sections of the pipeline;
pump means for pressurizing one section of said pipeline once said spherical member engages said lip surface to enable a verification of the pressure integrity of said one section; and
pump means for introducing a pressure differential across said seal to disengage said spherical member from said lip surface and permit the retrieval of said spherical member from said pipeline.

2. The system according to claim 1 wherein said spherical member is substantially neutrally buoyant with reference to said fluid so that said spherical member advances at approximately the center of the pipeline.

3. The system according to claim 1 wherein the ratio of the specific gravity of said spherical member to the specific gravity of the fluid passing through the pipeline is between about 0.70 and 3.00.

4. The system according to claim 3 wherein said ratio is between about 0.75 and 2.00.

5. The system according to claim 4 wherein said ratio is between about 0.85 and 1.50.

6. The system according to claim 5 wherein said ratio is approximately 1.0.

7. The system according to claim 1 wherein the inside diameter of said inner portion of said annular member is 80% to 95% of the diameter of said spherical member.

8. The system according to claim 7 wherein the inside diameter of said inner portion is 90% to 95% of the diameter of said spherical member.

9. The system according to claim 1 wherein said system further comprises:
said pipeline having a third section;
a second integral annular member adapted to be positioned between the second and third sections of the pipeline, said second annular member having an inner protruding portion with a lip surface; and
a second spherical member adapted for substantial longitudinal movement by pressure-induction along the interior of the pipeline and capable of passing by said first annular member and contacting said lip surface of said second annular member, said lip surface of said second annular member being curved at a radius of curvature substantially the same as the radius of curvature of said second spherical member so that upon engagement of said second spherical member with said lip surface, a pressure-tight seal separates the first and second sections from the third section,
wherein said first pump means for pressurizing permits the verification of the pressure integrity of the first and second sections once said second spherical member engages said lip surface of said second annular member.

10. The system according to claim 1 wherein said spherical member includes a polymeric coating to enhance the pressure-tight seal between said spherical member and said lip surface.

11. The system according to claim 10 wherein said polymeric coating is made of polyurethane.

12. The system according to claim 10 wherein said polymeric coating is made of neoprene.

13. The system according to claim 1 wherein said spherical member includes a hollow inner chamber.

14. The system according to claim 13 wherein said inner chamber is filled with a filler material to strengthen said spherical member.

15. A pipeline pressure sealing and separation system, said system comprising:
- a substantially horizontal pipeline, having at least two sections, adapted for the transport of a fluid thereby and being substantially impediment free;
- an annular member adapted to be positioned between the first and second sections of the pipeline, said annular member having an inner protruding portion with a lip surface;
- a spherical member adapted for substantial longitudinal movement along the interior of the pipeline and capable of being pumped along the pipeline and contacting said lip surface, the ratio of the specific gravity of said spherical member to the specific gravity of the fluid passing through the pipeline is between about 0.70 and 3.00, said lip surface being curved at a radius of curvature substantially the same as the radius of curvature of said spherical member so that upon engagement of said spherical member with said lip surface, a pressure-tight seal separates the first and second sections of the pipeline;
- pump means for pressurizing one section of said pipeline once said spherical member engages said lip surface to enable a verification of the pressure integrity of said one section; and
- pump means for introducing a pressure differential across said seal to disengage said spherical member from said lip surface and permit the retrieval of said spherical member from said pipeline.

* * * * *